(12) United States Patent
Davenport

(10) Patent No.: US 11,037,152 B2
(45) Date of Patent: Jun. 15, 2021

(54) ENHANCED SECURITY CREDIT CARD SYSTEM

(71) Applicant: Kevin E. Davenport, Elizabeth, NJ (US)

(72) Inventor: Kevin E. Davenport, Elizabeth, NJ (US)

( * ) Notice: Subject to any disclaimer, the term of this patent is extended or adjusted under 35 U.S.C. 154(b) by 184 days.

(21) Appl. No.: 16/111,846

(22) Filed: Aug. 24, 2018

(65) Prior Publication Data

US 2019/0026740 A1 Jan. 24, 2019

Related U.S. Application Data

(63) Continuation-in-part of application No. 14/998,471, filed on Jan. 8, 2016, now abandoned.

(51) Int. Cl.
*G06Q 20/40* (2012.01)
*G07F 7/08* (2006.01)
*G06Q 20/10* (2012.01)

(52) U.S. Cl.
CPC ......... *G06Q 20/4012* (2013.01); *G06Q 20/10* (2013.01); *G06Q 20/4018* (2013.01); *G07F 7/0846* (2013.01); *G07F 7/0853* (2013.01)

(58) Field of Classification Search
None
See application file for complete search history.

(56) References Cited

U.S. PATENT DOCUMENTS 3,931,497 A * 1/1976 Gentile .................... B67D 7/14
 235/381
4,752,966 A 6/1988 Schiller ........................ 382/125
(Continued)

OTHER PUBLICATIONS

"Zwipe, MasterCard Show Off Credit Card With a Fingerprint Sensor" at http://www.pcmag.com/article/2/0.2817.2470568.00.asp).

(Continued)

*Primary Examiner* — Neha Patel
*Assistant Examiner* — Gabriel Mercado
(74) *Attorney, Agent, or Firm* — Ernest D. Buff & Associates, LLC; Ernest D. Buff

(57) ABSTRACT

A system for enhanced security credit card has rechargeable battery, memory, processor, LCD display, thumbprint pad, magnetic swipe strip, multi-pin connector and USB port. The card is activated by the thumbprint of an authorized user, thereby turning on the blank LCD display to show a card number, expiration date, and CVV value. Additionally, the multi-pin connector is activated and inserted into credit card processing machine connector. This connection uploads the 'PIN value, photograph and credit limit of the user on the processing machine display, verifying the user's identity and authorizing the credit card purchase. The use of a magnetic strip for credit card purchase also requires a 'PIN' value, which is provided by insertion of a thumbprint activated credit card multi-pin connector. The enhanced security is provided by thumbprint activation, blank LCD display of the credit card number, expiration date and CVV value, insertion of the multi-pin connector and visual verification of the card holder with a photograph of the user.

10 Claims, 5 Drawing Sheets

(56) References Cited

U.S. PATENT DOCUMENTS

| | | | | |
|---|---|---|---|---|
| 5,653,617 | A * | 8/1997 | Seidler | H01R 12/57 439/876 |
| 6,325,285 | B1 * | 12/2001 | Baratelli | G06K 7/0021 235/380 |
| 6,772,956 | B1 | 8/2004 | Leaming | 76/83 |
| 7,013,293 | B1 * | 3/2006 | Kipnis | G06Q 20/102 705/40 |
| 7,984,848 | B1 * | 7/2011 | Browning | G07F 7/0866 235/380 |
| 8,534,546 | B2 | 9/2013 | McKelvey | 235/379 |
| 9,016,572 | B2 | 4/2015 | Babu et al. | 235/449 |
| 2004/0024700 | A1 | 2/2004 | Petigny | 705/39 |
| 2004/0161640 | A1 | 8/2004 | Salot | 429/121 |
| 2005/0139685 | A1 * | 6/2005 | Kozlay | G06K 19/077 235/492 |
| 2009/0037275 | A1 * | 2/2009 | Pollio | G06Q 30/0235 705/14.26 |
| 2013/0169233 | A1 * | 7/2013 | Tonegawa | B60L 3/12 320/134 |
| 2014/0084059 | A1 * | 3/2014 | Sierchio | G07F 7/0846 235/380 |
| 2014/0263624 | A1 * | 9/2014 | Guillaud | G07F 7/0853 235/380 |
| 2015/0025969 | A1 * | 1/2015 | Schroll | G06Q 20/208 705/14.53 |
| 2015/0026010 | A1 * | 1/2015 | Ellison | G06Q 30/0631 705/26.41 |
| 2015/0032635 | A1 * | 1/2015 | Guise | G06Q 20/40145 705/72 |
| 2015/0127553 | A1 * | 5/2015 | Sundaram | G06Q 30/0233 705/72 |
| 2015/0286855 | A1 | 10/2015 | Neskovic et al. | 382/125 |
| 2016/0299683 | A1 * | 10/2016 | Kwon | G06F 3/04886 |

OTHER PUBLICATIONS

"Why are EMV Transactions So Slow?" to Steel at https://www.lowcards.com/emv-transactions-slow 37884.

* cited by examiner

FIG 5.

7.5 Service code assignment

Table – Service code assignments

| Value | Position 1 | | Position 2 | Position 3 | |
|---|---|---|---|---|---|
| | Interchange | Technology | Authorization processing | Allowed services | PIN requirements |
| 0 | — | — | Normal [e] | No restrictions | PIN required |
| 1 | International [a] | — | — | No restrictions | — |
| 2 | International [a] | Integrated Circuit Card [b] | By issuer [f] | Goods and services only | — |
| 3 | — | — | — | ATM only | PIN required |
| 4 | — | — | By issuer [f] unless explicit bilateral agreement applies | Cash only | — |
| 5 | National [c] | — | — | Goods and services only | PIN required |
| 6 | National [c] | Integrated Circuit Card [b] | — | No restrictions | Prompt for PIN if PED present [9] |
| 7 | Private [d] | — | — | Goods and services only | Prompt for PIN if PED present [9] |
| 8 | — | — | — | — | — |
| 9 | Test | — | — | — | — |

ENHANCED SECURITY CREDIT CARD SYSTEM

This application is a continuation in part of U.S. patent application Ser. No. 14/998,471 filed Jan. 8, 2016, entitled "Enhanced Security Credit Card System", the disclosure of which is hereby incorporated in its entirety by reference thereto.

1. FIELD OF THE INVENTION

The present invention relates to credit cards; and more particularly to an enhanced security credit card system that has a plurality security features that verify an authorized purchase by the credit card user.

2. DESCRIPTION OF THE PRIOR ART

Numerous prior art patents and Internet disclosures describe systems for securing the validity of a credit card purchase. Over the years, credit card systems have provided a credit card with an embossed credit card number, expiration date and a magnetic swipe card that carries this information in an encrypted manner. The CVV (Card Verification Value) is a sequence of digits constructed by cryptographic process and written to the magnetic stripe of the card. The CVV is also printed on the back side of the credit card. CVV data is created by triple encryption of the card number, the expiration date and the service code using a special Card Verification key pair. The card security code is typically the last three or four digits that is printed, not embossed, on the back of the card. On American Express cards, the card security code is the four-digit number printed (not embossed) on the front towards the right. More recently a chip is included in the card, as read by a contact pin when the card is inserted into a credit card processing terminal.

U.S. Pat. No. 4,752,966 to Schiller discloses a fingerprint identification system. This automatic fingerprint enrollment and identification technique automatically processes an input image represented by pixels having either a one or zero value. The automatic processing involves a series of steps in which the initial processing is a rough screening technique for eliminating a reasonable portion of the noise while passing through almost all of the minutia. In the first step 37 templates are matched against the acquired fingerprint. As the steps proceed, the processing becomes more complex to provide a tighter screening out of noise while passing through as much of the minutia as possible. The later steps operate on relatively fewer minutia or anomaly points, with the result that the earlier steps can be economical though more complex and more discriminate than the later steps. The processing provides an optimum tradeoff that enrolls as large a proportion of the population as possible while minimizing the number of false identification errors. A template screens out the noise while a finer scanner method is used to determine the geometries of the finger print image. This method does not compare the acquired fingerprint with that stored in memory and representing the fingerprint of an authorized person; and is not operative to turn on security features if a match is found.

U.S. Pat. No. 5,653,617 to Seidler discloses a connector for substrates such as smart cards has a housing containing two parallel rows of spring contacts, each of which is held in a respective channel of the housing. Integral with each of the spring contacts and extending outside of one end of the housing is a terminal lead for connection to a substrate. The lead has a solder mass adjacent its end. The two parallel rows of solder-bearing leads will straddle and resiliently hold a substrate between them to improve accuracy in soldering during solder re-flow. The other end of the housing is provided with entry apertures for pins of a multi-pin connector, so that each pin will enter a respective housing channel to contact the spring contact therein. The entry apertures may accommodate a substrate with contact pads. The smart card does not display the image of the authorized user in the credit card processing monitor so that the agent can verify that the person charging a purchase is indeed the authorized user.

U.S. Pat. No. 6,772,956 to Learning discloses a smart card includes a card body and integrated circuit carried by the card body, including a microprocessor operative for communicating with a host and driving a signaling device indicative of smart card transactions between the smart card and a USB port of the host. The microprocessor is operative for modulating the signaling device based on operational attributes of the smart card and/or transactions between the smart card and USB port of the host. The card does not display the image of the authorized user in the credit card processing monitor so that the agent can verify that the person charging a purchase is indeed the authorized user.

U.S. Pat. No. 7,013,293 to Kipnis discloses a portable transaction device including transaction apparatus operative to participate in a monetary transaction, authorization apparatus operative to authorize the transaction apparatus to operate based on stored authorization parameters, and control apparatus operative to store the stored authorization parameters based on user input. The stored authorization parameters include at least one of the following: an identity of a user, a time period, and a distance. The device does not display the image of the authorized user in the credit card processing monitor so that the agent can verify that the person charging a purchase is indeed the authorized user.

U.S. Pat. No. 7,984,848 to Browning discloses a cash card system having a pair of financial instruments: a cash instrument and a security instrument, each encoded with a common PIN. The cash instrument, once preloaded with a cash balance, is used to purchase goods and services in cooperation with the pin. The security instrument, also in cooperation with the PIN, is used to recover a cash balance from the cash instrument in the event it is lost or stolen. The cash instrument and the security instrument are never used together to perform any transaction. One or both of the financial instruments may be a smart card having an embedded microchip. One or both of the financial instruments may be a card. The cash card may be a calculator-like structure having a display. In operation, the cash card system provides the anonymity of cash, the safety of traveler's checks and the convenience of a credit card. The cash card system does not display the image of the authorized user in the credit card processing monitor so that the agent can verify that the person charging a purchase is indeed the authorized user.

U.S. Pat. No. 8,534,546 to McKelvey discloses systems and methods for a card present transaction without sharing card information. These systems and methods enable an individual to complete a financial transaction by swiping a magnetic stripe card through a card reader connected to a mobile device. The size of the card reader is miniaturized so as to be portable for connection with the mobile device. The card reader is configured to reliably read data encoded in a magnetic strip of the card with minimum error. A single swipe provides a signal that corresponds to the data read to the mobile device. The incoming signal is then decoded from the card reader, which acts as a point-of-sale device to complete the financial transaction. Such an approach enables a person to become either a micro-merchant (payee) or a buyer/customer (payer) without having to purchase expensive card reader devices or software. This patent discloses a system and method for a card purchase transaction without sharing card information. A mobile credit card reader is connected to a mobile device such as a smartphone. No means are disclosed for detecting a thumbprint or enabling security features.

U.S. Pat. No. 9,016,572 to Babu, et al. discloses Systems and methods for financial transactions through a miniaturized card with ASIC. An application-specific integrated circuit (ASIC) is an integrated circuit (IC) customized for a particular use, rather than intended for general-purpose use. A card reader device is provided with a housing having a slot for swiping a magnetic stripe of a card to complete a financial transaction between a buyer and seller. A read head in the housing reads data stored on the magnetic stripe and produces a signal indicative of data stored on the magnetic stripe. An output jack is adapted to be inserted into a microphone input associated with a mobile device for providing the signal indicative of data stored on the magnetic stripe to the mobile device. A sourcing power device couples to an audio jack of the mobile device and sources power from the mobile device through the audio jack. This patent discloses a system and method for a financial transaction through a miniaturized card with ASIC. This device comprises a mobile credit card reader connected to a mobile device such as a smartphone. No means are provided for detecting a thumbprint or enabling security features present in the credit card.

U.S. Patent Application Pub. No. 2004/0024700 to Petigny discloses method and system for effecting the transfer of electronic funds includes a computer that is in electronic communication with an electronic payment device reader, with a funds source account and with a funds collection account. A funds transfer request is received from the electronic payment device reader, and a server, initiates the transfer of funds from the funds source account to the funds collection account in response to an action at the electronic payment device reader. An enhanced point-of-sale device is one of many types of electronic payment device readers that may be used to transfer funds between accounts in accordance. The method and system does not display the image of the authorized user in the credit card processing monitor so that the agent can verify that the person charging a purchase is indeed the authorized user.

U.S. Patent Application Pub. No. 2004/0161640 to Salot discloses a quick recharge energy storage device has a sufficient capacity due to the combination of a micro-battery and at least one micro-supercapacitor connected between two terminals of an integrated circuit. The integrated circuit, powered by the micro-battery, monitors high-speed (less than one second) charge of the micro-supercapacitors from an external energy source. The micro-supercapacitor can be connected in parallel with the micro-battery so as to subsequently recharge the micro-battery during the necessary time. The micro-battery provides a sufficient energy capacity, while the micro-supercapacitors allow high recharging speeds compatible with various applications (smart cards, smart labels, micro-system power supply, etc. . . . ). The micro-battery and micro-supercapacitors are preferably formed on the same substrate, either side by side or stacked. Series connection of several micro-supercapacitors provides sufficient voltage for charging the micro-battery. The device does not display the image of the authorized user in the credit card processing monitor so that the agent can verify that the person charging a purchase is indeed the authorized user.

U.S. Patent Application Pub. No. 2005/0139685 to Kozlay discloses a method for designing and manufacturing smartcards containing a low cost, embeddable, fully-integrated, fingerprint authentication system module. In a first preferred embodiment, the smartcard module contains a complete, unitary, autonomous data processing subsystem comprising a consolidated fingerprint authentication sensor including a data processor and memory; a power subsystem; and a smartcard interface subsystem. In a second preferred embodiment, the authentication system module of the present invention additionally contains an optional communication subsystem (e.g., ISO 14443 or other communication subsystem). The very small form factor of the enclosure for embedding the authentication system module provides a system module that is easily installed into an appropriate material substrate such as a smartcard body in a "one pass" automated insertion, saving manufacturing time, cost, and effort. The method and smart card does not display the image of the authorized user in the credit card processing monitor so that the agent can verify that the person charging a purchase is indeed the authorized user.

U.S. Patent Application Publication No. 2014/0084059 to Sierchio et al. discloses a universal interactive smart card device including a display, an interface device, a security device, and a storage device. The card device can include an on-board power supply for powering the display, interface device, security device, and storage device. The smart card does not display the image of the authorized user in the credit card processing monitor so that the agent can verify that the person charging a purchase is indeed the authorized user.

U.S. Patent Application Pub. No. 2015/0025969 to Schroll discloses an interface device fits between a point-of-sale terminal and a peripheral element, for example, the UPC scanner, to permit a rapid checkout of groceries or the like by simulating rapid scanning of a stored grocery list accumulated by a consumer in a roaming checkout through the store. The consumer scans items as he or she shops to create the stored grocery list. A promotional system for providing coupons at the point of purchase decision and the method of handling items that need to be weighed are also provided. The interface device does not display the image of the authorized user in the credit card processing monitor so that the agent can verify that the person charging a purchase is indeed the authorized user.

U.S. Patent Application Pub. No. 2015/0032635 to Guise discloses a system that includes an issuer system that receives, via a network, registration information from a mobile device, wherein the issuer system is associated with a financial institution that issues a smart card to a user and wherein the registration information includes an identifier of the mobile device, and a mobile device application associated with the issuer system, that when executed on a mobile device, communicates with the issuer system to validate the mobile device as a trusted device and enables the trusted device to communicate with the smart card and enable smart card management features mobile device application. The system does not display the image of the authorized user in the credit card processing monitor so that the agent can verify that the person charging a purchase is indeed the authorized user.

U.S. Patent Application Pub. No. 2015/0127553 to Sundaram discloses an intelligent payment card and a method for performing a financial transaction using the payment card are disclosed. The payment card includes inter-alia a biometric sensor, an input module, and a display screen. The payment card is activated when a primary user successfully authenticates himself by the way of providing valid finger print(s) to the biometric sensor of the payment card. The payment card is removably embedded with criteria that dictate at least a maximum transaction amount, maximum number of transactions to be performed on the card and maximum threshold time for completing a transaction. The payment card also includes a processor unit which compares the authorization code input by the user with a unique identification number stored within the payment card, and upon successful authentication enables the user to perform desired financial transaction and also ensures that the removably embedded criteria are not violated during the financial transaction. The card does not display the image of the authorized user in the credit card processing monitor so that the agent can verify that the person charging a purchase is indeed the authorized user.

U.S. Patent Application Publication No. 2015/0286855 to Neskovic Milan, et al discloses a fingerprint matching algorithm. A reference fingerprint image is matched with an input fingerprint image, represented by a first set of minutiae and a second set of minutiae by a method that includes the steps of: determining a first local neighborhood for each minutia including at least one minutia neighboring the minutia, comparing the first local neighborhoods in the first set with the first local neighborhoods in the second set to determine matched minutiae, filtering the matched minutiae based on a difference between their positions, determining a second local neighborhood for each unmatched minutia including at least one matched minutia neighboring the unmatched minutia, comparing the second local neighborhoods in the first set with the second local neighborhoods in the second set to determine further matched minutiae, filtering the matched minutiae and the further matched minutiae based on a difference between their positions, and determining whether the first and second fingerprint images are the same. This patent application discloses a fingerprint matching algorithm. This is a graphical method of recognizing finger print details and uses a series of distance measurements compared to stored finger print data with a finger print acquired by the finger print sensor when a user places a finger or thumb on the sensor. Recognition of the validity of the thumbprint is not used to enable the security function. The smart card does not have a multi-pin connector that physically connects to the credit card purchase-processing machine.

Internet Publication "Zwipe, MasterCard Show Off Credit Card With a Fingerprint Sensor" at http://www.pcmag.com/article2/0,2817,2470568,00. asp) is a PCMAG publication. The credit card has a fingerprint sensor over which the user places a finger during swiping of a card. The video of this 'Zwipe device' is present at the finger print sensor which harvests power from the reading device, as shown in the Internet publication figure. The 'Zwipe Internet publication does not disclose a battery powered device since it harvests energy from the reader to operate. The Internet publication does not indicate how the detected fingerprint by the finger print sensor is compared with a person's reference fingerprint. All the data is remotely transmitted with no physical contact between the charge card and the charge processing machinery. The credit card with finger print detection does not display the image of the authorized user in the credit card processing monitor so that the agent can verify that the person charging a purchase is indeed the authorized user.

Internet Publication "Why Are EMV Transactions So Slow?" to Steele found at https://www.lowcards.com/emv-transactions-slow-37884 discusses why EMV transactions are so slow. The article discusses how EMV transactions are taking far longer than those using a card's magnetic stripe. The article does not disclose or suggest a secure credit card system.

Based on the foregoing, there exists a need in the art for an easy to use, economical and highly reliable system that prevents fraudulent charges even when the credit card is lost or stolen. Since the credit card number, expiration and CVV data are unavailable in the enhanced security credit card in the inactive state, a lost or stolen credit card cannot be used for purchases, including in-person purchases at brick and mortar stores, telephone order purchases, and Internet purchases.

SUMMARY OF THE INVENTION

The system and method of this invention provides a system for an enhanced security credit card that is activated by a thumbprint of one or more authorized users. The credit card number, credit card expiration date and CVV value are only displayed in a normally blank LCD panel of the enhanced security credit card, which is battery powered. Accordingly, if the card is lost or stolen, it cannot be used for in store or Internet purchases due to advanced security features present in the enhanced security credit card system. Key features of the enhanced security credit card system include: 1) a card location over which the user may place the thumb so that the credit card recognizes the finger print and activates the security features of the credit card; 2) a normally blank LCD appointed to display the credit card number, expiration date and CVV code; 3) a multi-pin connector that is placed in a connector of a credit card purchase processing machine within a short time period, approximately 30 seconds, after thumb print activation; 4) a terminal of the credit card processing machine displaying the photograph of the credit card purchaser, whereupon the credit limit and the purchase is verified and approved by the purchase agent; 5) a picture of the user, and thumb print of the user which are downloaded into the battery powered memory of the credit card using USB connectivity to a home computer; and 6) photographs and thumb prints of children and other family members that the user may include, along with their credit card purchase limits. Additionally, the credit card includes a magnetic strip programmed according to the ISO/IEC standard 7811, but having a service code of '502', instead of '100' or "=" requiring the entry of the security code. The user, in cooperation with the credit card issuer's bank, sets this code similar to a 'PIN' used in debit cards. When the card is physically connected to the credit card processing machine within a short time after activation, approximately 30 seconds, the 'PIN' information is transferred.

Briefly stated, the features present in the Enhanced Security Credit Card System provide a higher level of security. Advantageously, the credit card number, expiration date and CVV are not displayed by the card when the card is not activated by the thumbprint of an authorized user. In the event that a lost card is found by a non-authorized person, the card is useless for making credit card purchases in a store or on the Internet due to the lack of availability of critical information. A credit card purchase requires (i) activation of the card by the thumbprint of an authorized user; (ii) physical contact by insertion of the credit card into a slot in the of the credit card processing machinery within a preselected time period of approximately 30 seconds after thumbprint activation; (iii) verification of the credit card charging person against a photo of the user by the credit card processing agent; and (iv) validation of the credit card purchasing limit by the credit card processing agent.

In an alternate embodiment, the enhanced security credit card uses a magnetic swipe strip that is provided on the back portion of the card. This magnetic swipe strip is produced according to the ISO/IEC standard 7811 so that the enhanced security credit card is readable by standard credit card transaction processing machinery. As usual, the magnetic swipe strip has three tracks, the first track having most of the information including bank name, primary user's first and last name, credit card number, and expiration date. Track 2 has redundant information along with most important CVV data. However, the magnetic swipe card cannot be solely used for making credit card purchases, since track 1 is altered to require the use of a 'PIN' to proceed the purchase process. The "PIN" is set by the primary user at the time the enhanced security credit card is issued by the bank and this 'PIN' is only known to the primary user and the computer software of the bank. The 'PIN' is not printed in the card or shown in the LCD display of the enhanced security credit card when it is thumbprint activated. The service code in track 2 of the magnetic strip is set to code '502'. The swiped magnetic strip of the credit card requires the disclosure of the 'PIN', which is accomplished by the insertion of the multi-pin connector of the thumbprint activated credit card into a corresponding slot in the credit card purchase processing machinery. The 'PIN' is not present in the magnetic swipe strip, but is present within the solid-state processor of the enhanced security credit card, as discussed below.

The 'PIN' is a secure code entered by the primary user when the issuing bank initially issues the enhanced security credit card. Thus 'PIN' code is only known to primary user and the bank's computer software. During the initial set up procedure, the primary user has to initially connect the USB connector of the enhanced security credit card to a home computer to provide the 'PIN' code using a specialized home computer software. The 'PIN' is stored in the memory of the enhanced security credit card. During the initialization of the enhanced security credit card a special software present in the computer allows the user to upload to the card a photograph of the primary user and the thumbprint. The thumbprint may be optionally obtained by the primary user by placing the thumb on the thumbprint pad. During this initial sign-up process, the primary user may add other family members by providing their corresponding photographs and thumbprints and setting their individual spending limits during credit card purchases. When this initial set up is complete, the Enhanced security credit card recognizes the authorized primary user and all other authorized family members.

In its preferred embodiment, the enhanced security credit card system of the present invention comprises:
 a) a microprocessor, a battery power source, an LCD display window, a fingerprint sensor pad, a multi-pin connector, a magnetic swipe strip and USB connector;
 b) a storage device located in the credit card for storing credit card issuing bank information, credit card number, expiration date, credit value verification (CVV), 'PIN' data, billing address, finger print data, and a photographic image of one or more authorized user;
 c) a fingerprint reader in communication with the fingerprint sensor pad adapted to read a fingerprint of the authorized user and compare it to stored finger print data in the storage device to determine the existence of a match;
 d) a switching relay adapted to be actuated if a match is established to cause the LCD display to display the credit card number, expiration date and CVV value, and enable power for the multi-pin connector;
 e) the multi-pin connector adapted to be inserted in a slot of a credit card processing terminal having a terminal screen and being adapted to communicate with the credit card issuing bank, the multi-pin connector adapted to transmit the stored photographic image of the authorized user for display on the terminal screen, whereby a store clerk processing the credit card transaction can visually validate the user;
whereby the credit card processing terminal is adapted to communicate with the credit card issuing bank for authorization of the transaction.

Optionally, the magnetic swipe portion of the enhanced security card being swiped in the credit card purchase processing terminal resulting in a request for a valid 'PIN', which is provided by inserting the multi-pin connector of the enhanced security credit card into the multi-pin connector of the credit card transaction processing machine.

The enhanced security credit card provides increased security of credit card use through display of the card information in response to a thumbprint match and visual validation of the user.

BRIEF DESCRIPTION OF THE DRAWING

The invention will be more fully understood and further advantages will become apparent when reference is had to the following detailed description of the preferred embodiments of the invention and the accompanying drawing, in which:

FIG. 5 is a table depicting variations of the service code of the magnetic swipe strip.

DETAILED DESCRIPTION OF THE INVENTION

Figure 1A:
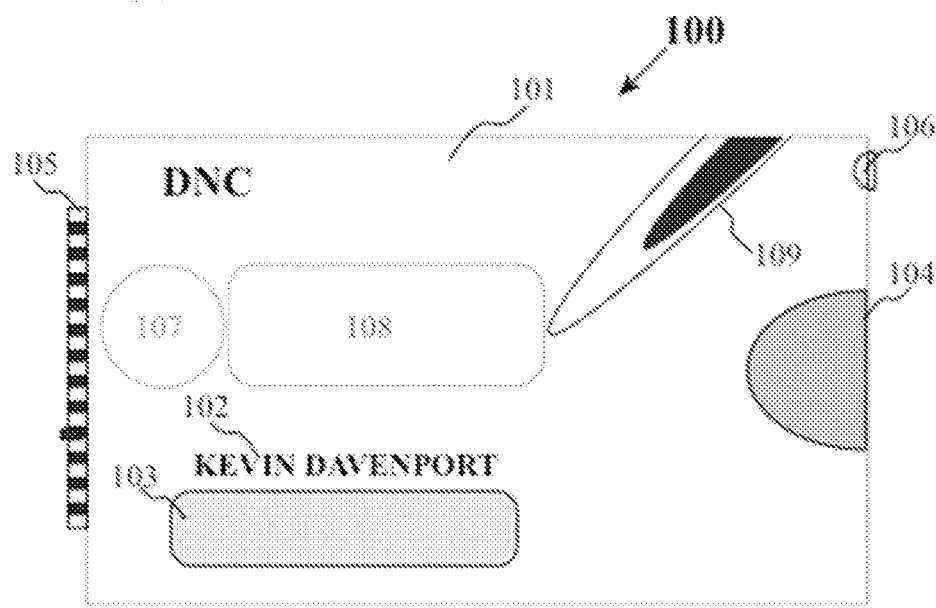
FIG. 1a illustrates the key elements of the enhanced security credit card when the thumbprint is not activated.

This invention relates to an enhanced security credit card system. Particularly, the enhanced security credit card system is a slim battery powered credit card device with only the name of the authorized user printed on the card. Directly below the name of the authorized user is a blank LCD screen that does not display the credit card number, card expiration date and credit verification value (CVV). The credit card has a darkened thumbprint sensor pad location for placing the thumb of the user. The enhanced security credit card has a memory chip and processing chip that are actuated when the user places his thumb on the thumbprint sensor pad. The credit card preferably includes an onboard microprocess and storage device. Upon being actuated, the system acquires the thumbprint of the user and compares the acquired thumbprint with that contained within the memory chip to determine the existence of a match. If a match is obtained, the security features of the enhanced security credit card are turned on. The blank LCD of the credit card now shows the credit card number, card expiration date and CVV value. The 'PIN' data' are not displayed, and the LCD remains on for about 30 seconds.

Additionally, the enhanced security credit card has a multi-pin connector which may be connected to a credit card processing terminal within the 30 seconds during which the multi-pin connector is activated. During this connection, the battery in the enhanced security credit card is charged by the power supply of the processing terminal. The enhanced security credit card system's multi-pin connector comprises pins carrying data and pins providing power supply to the credit card from the credit card processing terminal to charge the battery of the enhanced security credit card when the multi-pin is inserted into the credit card processing terminal. The multi-pin connector preferably has four pins, with inside pins carrying data (D+ and D−), and the outside pins provide a 5-volt power charge delivery supplied by the credit card terminal processor. An additional row of five pins, via USB 3.0-compatible cables having nine wires may be used. The connection could, alternatively, be a USBC connection. The terminal processor includes a port to receive the multi-pin connector of the credit card. The port is preferably a charging downstream port delivering 500 mA (0.5 A), 900 mA (0.9 A), or even 1,500 mA (1.5 A) for faster or rapid charging of the credit card.

The credit card uploads a photographic image of the authorized user and spending limit available to be shown on the display of the processing terminal. The agent processing the credit card transaction can verify the identity of the person processing the credit card transaction and allow the purchase to go through the system. This feature provides an additional level of security that virtually eliminates fraudulent credit card transactions.

The enhanced security credit card also has a USB terminal available for connectivity to a home computer. In the initial set-up process, the user accesses proprietary software present in the home computer. The user uploads the thumbprint by placing his thumb on the thumb pad of the enhanced security credit card. Additionally, a photograph of the primary user already present in the computer is uploaded to the enhanced security credit card. The PIN number agreed between the primary user and the credit card issuing company is also uploaded to the battery powered memory of the enhanced security credit card. The primary user sets the credit limit available for individual purchases.

The primary user may add additional family members including children. Each of the additional users provides their thumbprint and a photograph. The primary user also sets their spending limit. In this manner, the thumbprint of the children also turn on the security features of the enhanced security credit card.

The objective of the invention is to provide an enhanced security credit card that cannot be used by unauthorized parties that may gain access to a credit card that has been lost. Typically, the user must call the credit card issuing company to provide notification concerning the loss, whereupon any misappropriate charges are covered up to $500. The enhanced security card of the subject invention completely prevents misuse of the credit card.

The enhanced security credit card has a magnetic swipe strip, which conforms to ISO/TEC 7813 standards. Since the enhanced security credit card is actuated by the card holder's thumbprint, the magnetic swipe strip is unavailable for use when the thumbprint is not recognized. This is accomplished by setting the service code in the magnetic swipe strip coding to 502 instead of 101, as detailed in the discussions below. Thus, when the magnetic stripe of the enhanced security credit card is swiped, it results in a request for the pin number. This request is satisfied by inserting the multi-pin connector into the credit card purchase processing terminal after thumbprint actuation, whereupon the PIN number is provided for processing the credit card purchase.

Referring to Internet Publication ISO/TEC 7813 at https://en.wikipedia.org/wiki/ISO/IEC 7813, the structure of the magnetic swipe in a credit card per ISO/IEC is described. The magnetic swipe has three tracks, each track having specific information encoded.

The Track 1 structure of the magnetic swipe strip is specified as:

STX: Start sentinel "%"

FC: Format code "B" (The format described here. B is Bank. Format "^" is reserved for proprietary use.)

PAN: Primary Account Number, up to 19 digits

FS: Separator "^"

NM: Name, 2 to 26 characters (including separators, where appropriate, between surname, first name etc.)

FS: Separator "^"

ED: Expiration data, 4 digits or "^"

SC: Service code, 3 digits or "^"

DD: Discretionary data, balance of characters

ETX: End sentinel "?"

LRC: Longitudinal redundancy check, calculated according to ISO/IEC 7811-2

The maximum record length is 79 alphanumeric characters.

The Track 2 structure of the magnetic swipe strip is specified as:

STX: Start sentinel ";"

PAN: Primary Account Number, up to 19 digits, as defined in ISO/IEC 7812-1

FS: Separator "="

ED: Expiration date, YYMM or "=" if not present

SC: Service code, 3 digits or "=" if not present

DD: Discretionary data, balance of available digits

ETX: End sentinel "?"

LRC: Longitudinal redundancy check, calculated according to ISO/IEC 7811-2

The maximum record length is 40 numeric digits. e.g. 5095700000000

Track 3 of the magnetic swipe strip

Track 3 is virtually unused by the major worldwide networks and often isn't even physically present on the card by virtue of a narrower magnetic stripe.

The 'Internet Publication ISO/IEC 7813 at https://en.wikipedia.org/wiki/ISO/IEC 7813 details the three tracks of the magnetic stripe in a credit card, as dictated by ISO/TEC 7813. Track 1 has a specific format with a primary account number, expiration date, and service code which state how the transaction is to be processed. Track 2 has redundant data as in Track 1.

Internet Publication "Track format of magnetic stripe cards" at http://www.gae.ucm.es/~padilla/extrawork/track-s.html details the structure and format of the magnetic swipe strip in a credit card.

The details of the service code are set forth below.

SC: Service Code. 3 digits

Digit 1 (most significant): Interchange and technology:

0: Reserved for future use by ISO.

1: Available for international interchange.

2: Available for international interchange and with integrated circuit, which should be used for the financial transaction when feasible.

3: Reserved for future use by ISO.

4: Reserved for future use by ISO.

5: Available for national interchange only, except under bilateral agreement.

6: Available for national interchange only, except under bilateral agreement, and with integrated circuit, which should be used for the financial transaction when feasible.

7: Not available for general interchange, except under bilateral agreement.

8: Reserved for future use by ISO.

9: Test.

Digit 2: Authorization processing:

0: Transactions are authorized following the normal rules.

1: Reserved for future use by ISO.

2: Transactions are authorized by issuer and should be online.

3: Reserved for future use by ISO.

4: Transactions are authorized by issuer and should be online, except under bilateral agreement.

5: Reserved for future use by ISO.

6: Reserved for future use by ISO.

7: Reserved for future use by ISO.

8: Reserved for future use by ISO.

9: Reserved for future use by ISO.

Digit 3 (least significant): Range of services and PIN requirements:

0: No restrictions and PIN required.

1: No restrictions.

2: Goods and services only (no cash).

3: ATM only and PIN required.

4: Cash only.

5: Goods and services only (no cash) and PIN required.

6: No restrictions and require PIN when feasible.

7: Goods and services only (no cash) and require PIN when feasible.

8: Reserved for future use by ISO.

9: Reserved for future use by ISO.

Referring to Internet publication 'Open Security Research: Deconstructing a Credit Card's Data' at http://blog.opensecurityresearch.com/2012/02/deconstructing-credit-cards-data.html, details for all possible service codes available under ISO/TEC 7803 are shown in the table below. The service code in the track 2 of the magnetic swipe strip is a three-digit number with each digit representing specific card functionality. The table shown below provides all variations of the service code. For example, a service code of 101 represents that the card is available for international interchange. Transactions are authorized without restrictions, and do not require a 'PIN'. On the other hand, a service code of 502 represents that the card is available for national interchange only, except under bilateral agreement, transactions are authorized following normal use and require a 'PIN'. The PIN' is provided by the insertion of a thumbprint activated enhanced security credit card's multi-pin connector into the connector of the credit card processing machine, enabling credit card transaction authorization.

The system of subject invention provides enhanced security for credit card purchases. The credit card number, expiration date and CVV number are shown only when the fingerprint/thumbprint of the user is recognized. The card has a magnetic strip which when used requires a pin due to service code 502 and is provided by physical connection of a multi-pin connector of the card with that provided in the credit card processing terminal. The photographic image of the user is transmitted from the card to the credit card processing terminal display, enabling verification of the identity of the credit card user.

Fingerprint biometric and/or facial recognition biometric authentication technology. The uploaded fingerprint for each user acts as a template used to determine if the point of sale individual's fingerprint matches an uploaded fingerprint template for a user. A fingerprint sensor is integrated on the credit card for uploading the fingerprint template of each user. A CPU may be on-board the credit card for verification of the fingerprint through the credit card itself. Alternatively, the data is transmitted to the credit card processing terminal at the point of sale and the software for matching or comparing the fingerprint template to the point of sale fingerprint is carried out by the credit card processing terminal, thereby providing authentication that the individual is an authorized user of the credit card.

As a second tier of fraud defense, the photographic image of the user's face is transmitted to and displayed on a screen of the point of sale credit card processing terminal for visual validation by the clerk. The clerk visually compares the photographic facial image displayed on the terminal screen with the face of the customer/individual prompting the point of sale transaction. If the clerk determines the customer is an authorized user based on similarity between the photograph and user, then the clerk move forward with the transaction. If the clerk does not find the photograph to be the customer, the clerk can immediately decline the use of the credit card for the purchase. In an alternative embodiment, facial recognition biometric technology may be used instead of visual validation by the clerk. Wherein facial identification technology is used, the point of sale individual/customer looks toward a camera or facial recognition screen. The facial recognition technology compares the uploaded photograph associated for each user and the point of sale individual's face to determine if the facial structure is a match to an authorized user's facial structure/photographic image. The fingerprint biometric data may be used alone, in conjunction with the facial recognition biometric, or facial recognition biometric may be used instead of the fingerprint biometric data.

FIG. 1a illustrates generally at 100 the key elements of the enhanced security credit card when the thumbprint is not activated. The credit card is slim bearing dimensions similar to a typical credit card so that is can fit within a wallet and so that it can fit within a credit card reader's magnetic strip reading slot. Preferably, having dimensions of 3.370×2.125 in with rounded corners having a radius of 2.88-3.48 mm. The front face 101 of the card is relatively featureless with only the name of the authorized primary user shown at 102. A blank LCD screen 103 is shown directly below the name of the user. The right side of the card has a thumbprint pad 104 over which the user can place the thumb. The left edge of the card has a multi-pin connector 105 that is capable of physical connectivity to credit card transaction processing machinery. A USB connection is provided at 106 for connection to a computer for uploading a picture of the thumbprint and photograph of one or more approved users as selected by the primary user. The connection 106 could, alternatively, be a USBC connection. The enhanced security credit card has a battery shown at 107 and powers a microprocessor 108 with memory and computational capability both placed inside the card and hence shown as being less opaque.

Figure 1B:
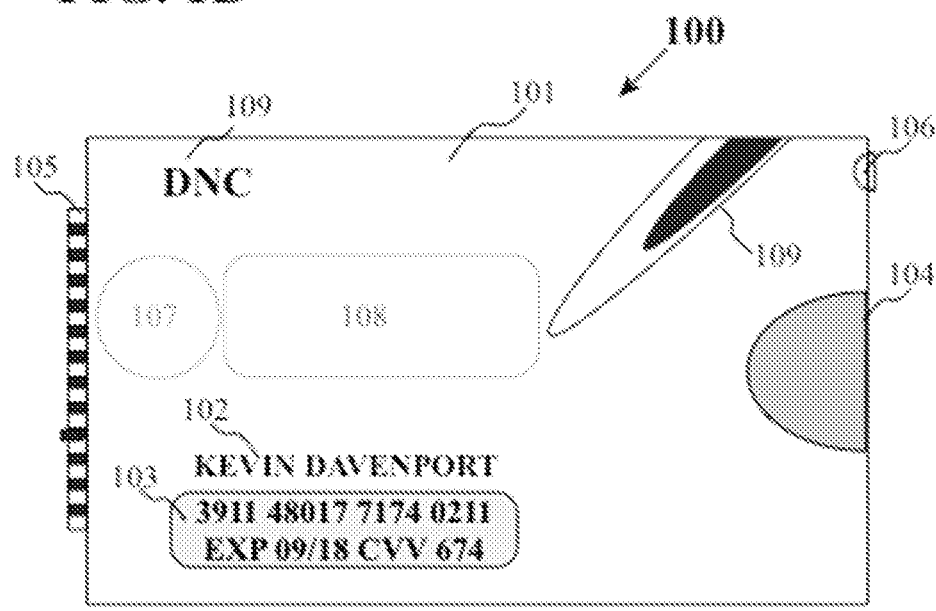
FIG. 1b illustrates the key elements of the enhanced security credit card when the thumbprint is activated.

FIG. 1b illustrates generally at 100 the key elements of the enhanced security credit card when the thumbprint is activated. The credit card is slim and is attractive in design. The front face 101 of the card has the name of the authorized primary user shown at 102. An LCD screen 103, activated when the cardholder's thumb is placed on the thumb pad 104, now shows the credit card number and expiration date, while the CVV is shown directly below the name of the user. When the fingerprint of the user at the point of sale matches that of an uploaded fingerprint of an authorized user, authenticity of the user at the point of sale is validated. Upon a match or validation, the microprocessor activates a switching relay or relay which, upon activation, transmits the credit card number, expiration date and CVV to be displayed on the LCD screen of the credit card.

Figure 2:
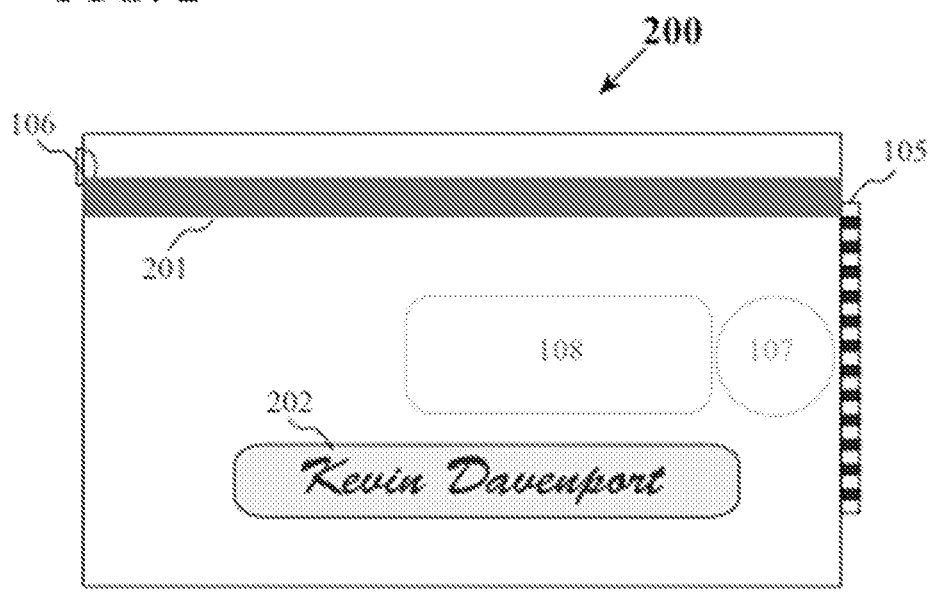
FIG. 2 is an illustration of the backside of the enhanced security credit card.

FIG. 2 illustrates generally at 200 the backside of the card. Shown therein are both the multi-pin connector 105 and USB port 106 in proper orientation. The battery and microprocessor are also shown dimmed since they are inside the card. The magnetic swipe strip is shown at 201. The location where the primary user signs is shown at 202.

Figure 3:
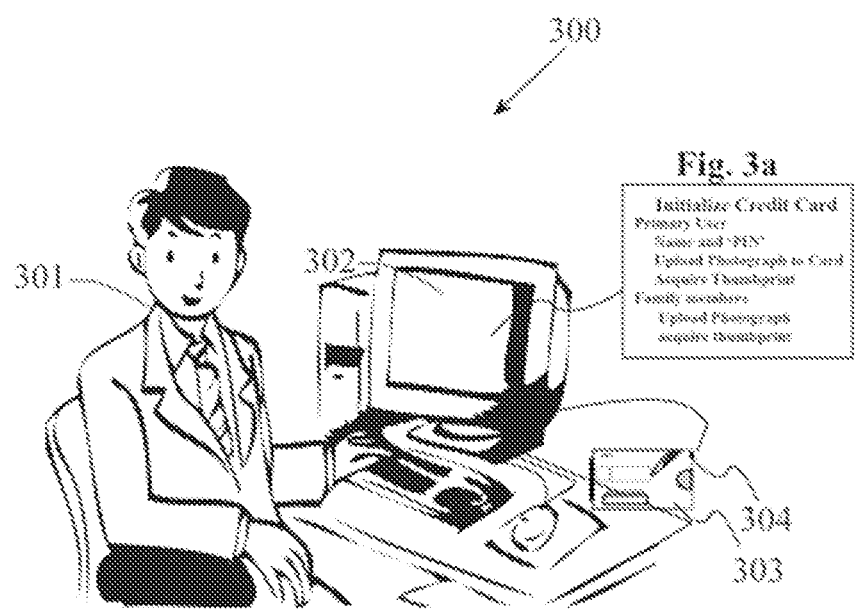
FIG. 3 is an illustration of the enhanced security credit card initialization process by the primary user.
Figure 4:
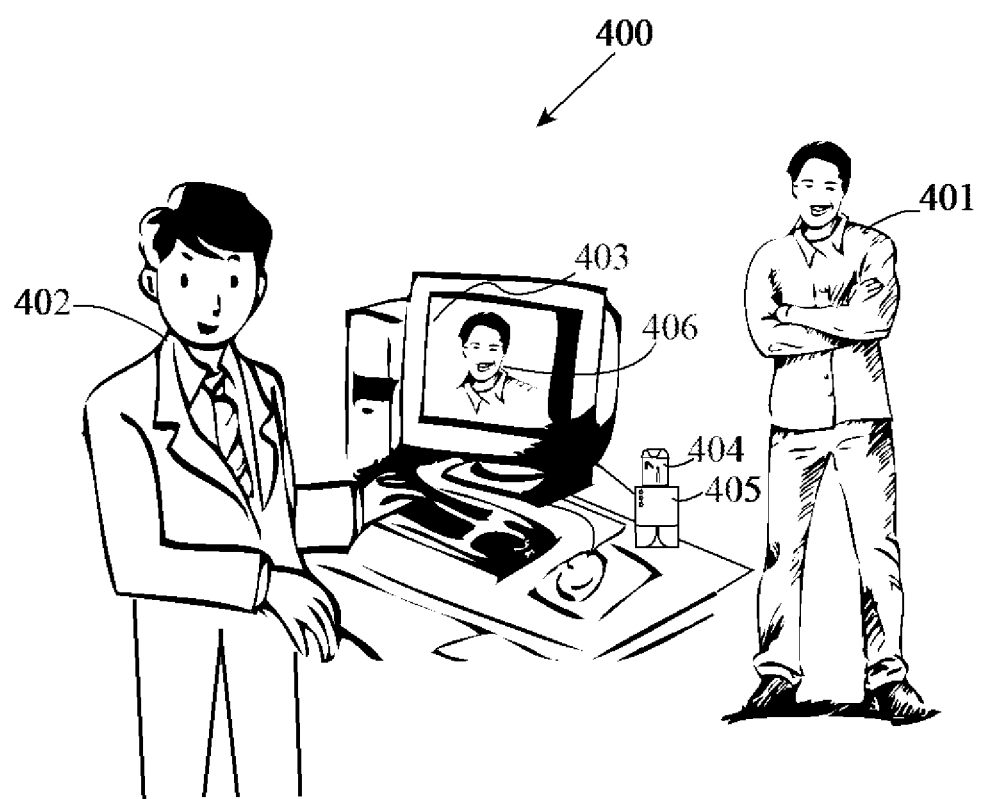
FIG. 4 is an illustration of the purchase process using the enhanced security credit card.

FIG. 3 illustrates generally at 300 the initialization process of the enhanced security credit card. The primary user 301 is shown in front of a computer that runs specialize software. The screen of the computer shows the questions asked by the specialized software. The USB or, alternatively USBC port 304 of the enhanced security credit card 303 is connected to the computer when the specialized software is running. Since the magnetic strip of the enhanced security credit card already has the primary user' name, the prompt that requires the name of the primary user must match what is imprinted in the magnetic strip. The primary user must upload to the enhanced security credit card the "PIN" agreed with the card-issuing bank. The primary user next uploads a photograph to the enhanced security credit card memory from the computer, as shown in insert at FIG. 3a. The thumbprint of the primary user is either acquired by placing the thumb on the thumb pad or from a previously scanned thumbprint present in the computer. At this point, the primary user is authorized to use the enhanced security credit card. Next the primary user authorizes one or more family members by uploading their photographs from the computer to the enhanced security credit card. Each required family member's thumbprint is obtained through use of the thumb pad of the enhanced security credit card or uploaded from the computer. Additionally, the primary user sets a spending limit for each of the family members FIG. 4 is an illustration of the purchase process at 400 using the enhanced security credit card. The purchaser 401 has inserted a thumbprint activated enhanced security credit card 405, within 30 seconds of activation, into a slot in the purchase processing machine 404 which is connected to the purchase terminal 403. The enhanced security credit card uploads the image of the user whose thumbprint activated the card, and appears at the processing terminal screen at 406. The merchant compares the photographic image with the person making the purchase. When a match is evident, the merchant approves the purchase.

Having thus described the invention in rather full detail, it will be understood that such detail need not be strictly adhered to. The LCD is normally blank and does not show the user's credit card number actuated by the user's thumb print. The LCD may be configured for multi-color illumination, or illumination in contrasting colors or brightness that show part or all of the credit card number, such as the last 4 digits or the CVV number. The card may be composed of plastic or metal, including aluminum foil or fabric containing 27% Copper and 50% Nickel, and made available in a variety of colors and color combinations, including graphite gray, blue and the like. A protector case can be used to shield the card against scanning attempts to wrongfully obtain information therefrom. The card is robust and strong, comprising up to 3 laminated layers or more and can be covered with compression layered laminated glass, such as Gorilla Glass or the like. These as well as many additional changes and modifications may suggest themselves to one skilled in the art, all falling within the scope of the invention as defined by the subjoined claims.

What is claimed is:

1. An enhanced security credit card system, comprising:
a) a credit card having a microprocessor, a battery power source,
a Liquid-crystal display (LCD) window, a fingerprint sensor pad, a multi-pin connector, a magnetic swipe strip and Universal Serial Bus (USB), Universal Serial Bus Type-C (USB-C) or Lightning connector;
b) a storage device located in the credit card for storing credit card issuing bank information, credit card number, expiration date, credit value verification (CVV), personal identification number ('PIN') data selected by a primary user, billing address, finger print data, and a photographic image of one or more authorized user and available spending limit;
c) a fingerprint reader in communication with the fingerprint sensor pad adapted to read a fingerprint of the authorized user and compare it to stored finger print data in the storage device to determine the existence of a thumbprint match;
d) a switching relay adapted to be actuated if a match is established to cause the LCD display to display card information for a preselected time period, said card information including the credit card number, expiration date and CVV value, and, during said preselected time period, enable power for the multi-pin connector, which is thereby turned on by said card and remains on for said preselected time period;
e) the multi-pin connector configured for insertion into a slot of a credit card processing terminal having a terminal screen and being configured for communication with the credit card issuing bank, the multi-pin connector configured to transmit the stored photographic image of the authorized user and available spending limit, which is displayed on the terminal screen to visually validate the user and available spending limit during a credit card transaction and provide a feature that affords an additional level of security;
f) said credit card processing terminal being configured to communicate with the credit card issuing bank for authorization of the transaction; and
g) said display of the card information on said LCD display during said preselected time period in response to a thumbprint match, and said display of said authorized user's photographic image and available spending limit on said terminal screen of said processing terminal providing a safe and accurate visual validation of the user and available spending limit, and increased security of credit card use.

2. The enhanced security credit card system as recited by claim 1, said 'PIN' data being selected by said primary user at the time the enhanced security card is issued and being only known to the primary user and the bank.

3. The enhanced security credit card system as recited by claim 1, wherein the magnetic swipe portion of the enhanced security card is configured to be swiped in the credit card purchase processing terminal to initiate a request for a valid 'PIN', and said multi-pin connector of the thumbprint activated enhanced security credit card is configured for insertion into the multi-pin connector of the credit card transaction processing machine to provide said 'PIN'.

4. The enhanced security credit card system as recited by claim 3, wherein the multi-pin connector comprises pins carrying data and pins providing power supply to the credit card from the credit card processing terminal to charge the battery of the enhanced security credit card when the multi-pin is inserted into the credit card processing terminal.

5. The enhanced security credit card system as recited by claim 1, wherein the said USB, USBC or Lightning connector port of the enhanced security credit card is configured for initial set up of the credit card through a connection to a home computer with specialized software configured for uploading into enhanced credit card memory the 'PIN' data, a photograph of the primary user and available spending limit, and a thumbprint of the primary user for authorization of the primary user.

6. The enhanced security credit card system as recited by claim 5, wherein thumbprint data is uploaded from the home computer.

7. The enhanced security credit card system as recited by claim 5, wherein thumbprint data is uploaded when primary user places a thumb on the fingerprint sensor pad.

8. The enhanced security credit card system as recited by claim 5, wherein the initial set up includes uploading a photograph, thumbprint and credit card use limit for transactions for family members authorizing said family members.

9. The enhanced security credit card system as recited by claim 8, wherein the thumb of authorized family members when placed on the thumb pad fingerprint sensor pad is recognized by said credit card, a memory chip and processing chip of said microprocessor are thereby actuated, the system acquires the thumbprint of said authorized family member and compares the acquired thumbprint with that contained within the memory chip to determine the existence of a match, and if a match is obtained, certain security features of the enhanced security credit card that comprise said LCD display showing the credit card number, card expiration date and CVV value are turned on by said card and remain on for 30 seconds.

10. The enhanced security credit card system as recited by claim 1, wherein a maximum transaction limit for the one or more authorized user is displayed on the screen of the credit card processing terminal.

\* \* \* \* \*